United States Patent
Soh et al.

(10) Patent No.: US 11,518,272 B2
(45) Date of Patent: Dec. 6, 2022

(54) METHOD OF CONTROLLING A PE-BATTERY WATER COOLING SYSTEM FOR A GREEN VEHICLE

(71) Applicants: HYUNDAI MOTOR COMPANY, Seoul (KR); KIA MOTORS CORPORATION, Seoul (KR)

(72) Inventors: Hyun Jun Soh, Seongnam-si (KR); Gun Seok Yoon, Seoul (KR); Jin Oh, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 432 days.

(21) Appl. No.: 16/667,431

(22) Filed: Oct. 29, 2019

(65) Prior Publication Data

US 2020/0331360 A1 Oct. 22, 2020

(30) Foreign Application Priority Data

Apr. 22, 2019 (KR) ........................ 10-2019-0046576

(51) Int. Cl.
| | | |
|---|---|---|
| B60L 58/26 | (2019.01) | |
| B60L 50/64 | (2019.01) | |
| H01M 10/613 | (2014.01) | |
| H01M 10/6567 | (2014.01) | |
| H01M 10/6551 | (2014.01) | |
| H01M 10/625 | (2014.01) | |

(52) U.S. Cl.
CPC ............... *B60L 58/26* (2019.02); *B60L 50/64* (2019.02); *H01M 10/613* (2015.04); *H01M 10/625* (2015.04); *H01M 10/6551* (2015.04); *H01M 10/6567* (2015.04); *H01M 2220/20* (2013.01)

(58) Field of Classification Search
CPC ...... B60L 58/26; B60L 50/64; H01M 10/613; H01M 10/625; H01M 10/6551; H01M 10/6567; H01M 2220/20
USPC .......................................................... 165/200
See application file for complete search history.

(56) References Cited

U.S. PATENT DOCUMENTS

| | | | | |
|---|---|---|---|---|
| 6,360,835 | B1* | 3/2002 | Skala ................ | H01M 8/04029 180/65.22 |
| 7,789,176 | B2* | 9/2010 | Zhou .................. | B60H 1/32281 180/65.1 |
| 9,533,546 | B2* | 1/2017 | Cheng ...................... | B60K 1/04 |
| 9,533,547 | B2* | 1/2017 | Cheng ...................... | B60K 1/04 |
| 9,533,551 | B2* | 1/2017 | Cheng ...................... | B60H 1/00428 |
| 9,731,578 | B2* | 8/2017 | Johnston ............ | B60H 1/00278 |
| 9,758,010 | B2* | 9/2017 | Johnston .............. | B60H 1/3213 |
| 9,802,460 | B2* | 10/2017 | Cheng ................ | H01M 10/663 |
| 10,476,051 | B2* | 11/2019 | Mardall ................ | H01M 50/20 |
| 10,843,550 | B2* | 11/2020 | Wong ...................... | B60L 1/003 |
| 2011/0296855 | A1* | 12/2011 | Johnston .................. | B60L 58/18 62/79 |

(Continued)

*Primary Examiner* — Tho V Duong
*Assistant Examiner* — Raheena R Malik
(74) *Attorney, Agent, or Firm* — Lempia Summerfield Katz LLC (57) ABSTRACT

A method of controlling a PE-battery water cooling system for a green vehicle enables cooling of PE components and a battery by means of a cooperative control between a PE cooling system and a battery cooling system even when a part among the components of the PE-battery water cooling system fails.

8 Claims, 7 Drawing Sheets

(56) References Cited

U.S. PATENT DOCUMENTS

2017/0106725 A1\* 4/2017 Kim ................... B60H 1/00278
2017/0253105 A1\* 9/2017 Allgaeuer .......... B60H 1/00385

\* cited by examiner

X : fails

METHOD OF CONTROLLING A PE-BATTERY WATER COOLING SYSTEM FOR A GREEN VEHICLE

CROSS REFERENCE TO RELATED APPLICATION

The present application claims priority to Korean Patent Application No. 10-2019-0046576, filed Apr. 22, 2019, the entire contents of which are incorporated herein for all purposes by this reference.

BACKGROUND

Field of the Disclosure

The present disclosure relates to a method of controlling a power electronics (PE)-battery water cooling system for a green vehicle. More particularly, the present disclosure relates to a method of controlling a PE-battery water cooling system for a green vehicle, the method enabling excellent cooling of power electronics, i.e., PE components and a battery even when a component that is cooling the PE components and the battery is out of order.

Description of the Related Art

As is well known, an electric vehicle or a hybrid vehicle is equipped with power electronics (PE) components including a motor, an inverter, an on-board charger (OBC), and the like. Such a vehicle is also equipped with a battery supplying power to the PE components.

The PE components and the battery generate heat during operation. Therefore, cooling the PE components and the battery is required to protect the PE components and the battery and ensure the durability thereof.

To this end, the electric vehicle or the hybrid vehicle is equipped with a PE component water cooling system for cooling the PE components and a battery water cooling system for cooling a battery.

The PE components and the battery have different temperature ranges in each main operation area. That is, the PE components and the battery require separate cooling systems because the PE components operate at a temperature higher than the battery.

However, a cooling system for the PE components and the battery is not separately constructed. Instead, a variable cooling system, in which cooling systems for the PE components and the battery are integrated into a single system, is used to enhance the efficiency of the cooling system.

The variable cooling system uses one cooling path to cool the PE components and the battery and is referred to as a PE-battery water cooling system.

Hereinafter, a configuration and an operation of the PE-battery water cooling system is described.

Figure 1:
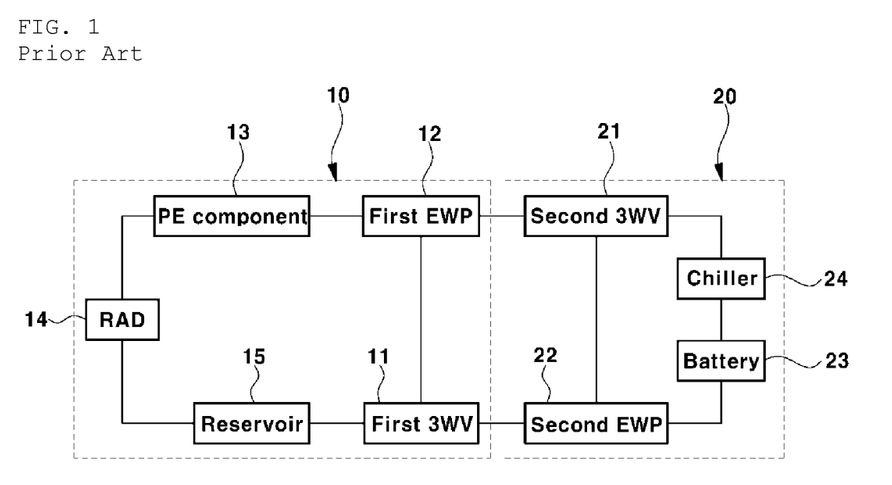
FIG. 1 is a configuration diagram illustrating a configuration of a power electronics (PE)-battery water cooling system and a connection therein.

The accompanying FIG. 1 is a configuration diagram illustrating the configuration of a PE-battery water cooling system and a connection therein.

The PE-battery water cooling system includes a PE cooling system 10 for cooling the PE components and a battery cooling system 20 for cooling the battery. The PE-battery water cooling system is configured such that the PE cooling system 10 and the battery cooling system. 20 are independently operated or integrated into one by a pair of three-way valves 11 and 21.

The PE cooling system 10 includes: a first electric water pump (EWP) 12 pumping a coolant to a cooling passage of a PE component 13; a radiator (RAD) 14 cooling the coolant discharged after circulating through the PE component 13; and a reservoir 15 where the coolant is accommodated.

The battery cooling system 20 includes a second EWP 22 pumping the coolant to a cooling passage of a battery 23 and a chiller 24 discharging the coolant circulating through the battery 23 and receiving heat from the battery 23 to the outside.

A first three-way valve 11 of the pair of three-way valves 11 and 21 is connected and interposed between the reservoir 15, the first EWP 12, and the second EWP. The first three-way valve 11 is switched so that the coolant from the reservoir 15 flows into the first EWP 12 or the second EWP 22.

A second three-way valve 21 of the pair of three-way valves 11 and 21 is connected and interposed between the chiller 24, the first EWP 12, and the second EWP. The second three-way valve 21 is switched so that the coolant from the chiller 24 flows into the first EWP 12 or the second EWP 22.

In the PE-battery water cooling system, a controller (not illustrated) controls the switching of the first three-way valve 11 and the second three-way valve 21 depending on the temperature of the coolant. Accordingly, a separate cooling mode and an integrated cooling mode may be implemented. In the separate cooling mode, the coolant flows independently in the PE cooling system 10 and the battery cooling system 20. In the integrated cooling mode, the coolant flows in both the PE cooling system 10 and the battery cooling system 20.

Figure 2:
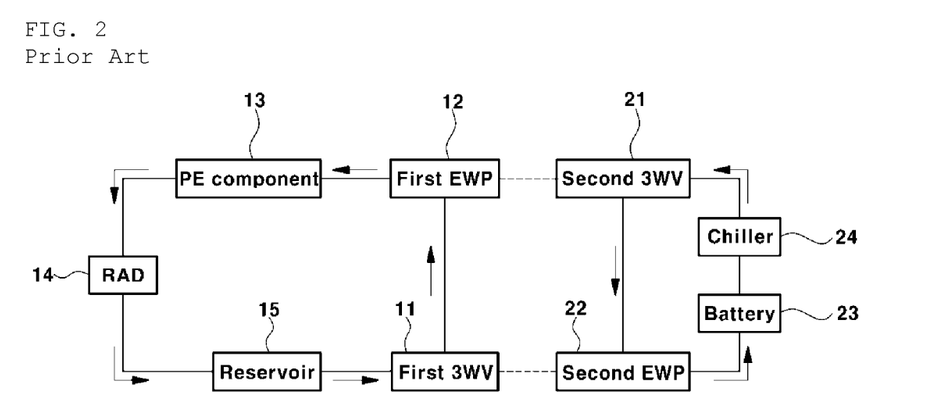
FIG. 2 is a configuration diagram illustrating the PE-battery water cooling system in a separate cooling mode.

For example, when the temperature of the coolant circulating through the PE cooling system 10 becomes a predetermined level or higher, as illustrated in FIG. 2, the controller controls the switching of the first three-way valve 11 and the second three-way valve 21 to prevent an exchange of the coolant between the PE cooling system 10 and the battery cooling system 20. Accordingly, the separate cooling mode is realized, in which the PE cooling system 10 and the battery cooling system 20 are separated from each other.

Figure 3:
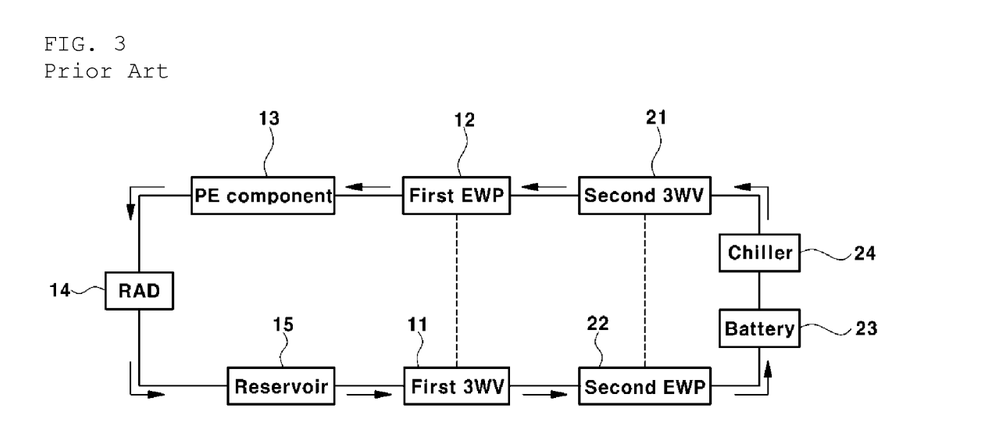
FIG. 3 is a configuration diagram illustrating the PE-battery water cooling system in an integrated cooling mode.

Conversely, when the temperature of the coolant circulating through the PE cooling system 10 is below the predetermined level or when the temperature of the battery is below a predetermined level so a rise in the temperature of the battery is required, as illustrated in FIG. 3, the controller controls the switching of the first three-way valve 11 and the second three-way valve 21 to allow the exchange of the coolant between the PE cooling system 10 and the battery cooling system 20. Accordingly, the integrated cooling mode is realized.

As described above, the PE-battery water cooling system has an advantage in that it is easy to change between the separate cooling mode and the integrated cooling mode according to the temperature and a cooperative control of the PE cooling system and the battery cooling system. This improves the cooling efficiency.

Each component constituting the PE-battery water cooling system functions mutually according to the cooperative control, so that it is easy to change between the separate cooling mode and the integrated cooling mode. However, there is a problem in that switching between the separate cooling mode and the integrated cooling mode is impossible when any one of the components fails. Thus, the overall cooling function of the PE-battery water cooling system may be lost.

In addition, when the cooling function of the PE-battery water cooling system is lost or when it is impossible to switch between the separate cooling mode and the integrated cooling mode, overheating may occur and the PE components, such as the inverter and the motor, may be burned out. This can lead to shutdown of the vehicle. Furthermore, an input-output current of the battery may be limited and the battery life may be reduced because the battery cannot maintain a proper temperature.

SUMMARY

Accordingly, the present disclosure has been made, keeping in mind the above problems occurring in the related art. The present disclosure is intended to provide a method of controlling a power electronics (PE)-battery water cooling system for a green vehicle. The method enables cooling of PE components and a battery by means of a cooperative cooling control between a PE cooling system and a battery cooling system even when a part of the components of the PE-battery water cooling system fails.

In order to achieve the above objective, the present disclosure provides a method of controlling a PE-battery water cooling system for a green vehicle. In the method, the PE-battery water cooling system includes a PE cooling system in which a first electric water pump (EWP), a PE component, a radiator, a reservoir, and a first three-way valve are connected in order. The system also includes a battery cooling system in which a second EWP, a battery, a chiller, and a second three-way valve are connected in order. The method includes switching the first three-way valve and the second three-way valve forcibly in a direction allowing a coolant to flow between the PE cooling system and the battery cooling system when a failure occurs in the components of the PE cooling system and the battery cooling system. The method also includes driving at least one of the components of the PE cooling system and the battery cooling system still functioning normally to maximum.

The first three-way valve and the second three-way valve may be forcibly switched by a control signal of a controller in the direction allowing the coolant to flow between the PE cooling system and the battery cooling system such that the PE cooling system and the battery cooling system are switched from a separate cooling mode to an integrated cooling mode.

Among the components of the PE cooling system and the battery cooling system, when the first EWP of the PE cooling system fails during driving of the vehicle, the first three-way valve and the second three-way valve may be forcibly switched by a control signal of a controller in the direction allowing the coolant to flow between the PE cooling system and the battery cooling system. The second EWP of the battery cooling system may be driven to maximum by a control signal of the controller.

With the second EWP driven to maximum, a fan motor of the radiator and the chiller may be driven to maximum by a control signal of the controller.

Among the components of the PE cooling system and the battery cooling system, when the second EWP of the battery cooling system fails during driving of the vehicle, the first three-way valve and the second three-way valve may be forcibly switched by a control signal of a controller in the direction allowing the coolant to flow between the PE cooling system and the battery cooling system. The first EWP of the PE cooling system may be driven to maximum by a control signal of the controller.

With the first EWP driven to maximum, a fan motor of the radiator and the chiller may be driven to maximum by a control signal of the controller.

Among the components of the PE cooling system and the battery cooling system, when the second EWP of the battery cooling system fails during charging of the battery, the first three-way valve and the second three-way valve may be forcibly switched by a control signal of a controller in the direction allowing the coolant to flow between the PE cooling system and the battery cooling system. The first EWP of the PE cooling system may be driven to maximum by a control signal of the controller.

Among the components of the PE cooling system and the battery cooling system, when the chiller of the battery cooling system fails, the first three-way valve and the second three-way valve may be forcibly switched by a control signal of a controller in the direction allowing the coolant to flow between the PE cooling system and the battery cooling system. The first EWP and the second EWP may be driven simultaneously by a control signal of the controller and a fan motor of the radiator may be driven to maximum by a control signal of the controller.

Among the components of the PE cooling system and the battery cooling system, when a fan motor of the radiator of the PE cooling system fails, the first three-way valve and the second three-way valve may be forcibly switched by a control signal of a controller in the direction allowing the coolant to flow between the PE cooling system and the battery cooling system. The first EWP and the second EWP may be driven simultaneously by a control signal of the controller and the chiller may be driven to maximum by a control signal of the controller.

The present disclosure provides the following effects in accordance with the above technical solution.

First, even when a part of the components of a PE-battery water cooling system fails, excellent cooling of PE components and a battery can be performed by a cooperative cooling control between the PE cooling system and the battery cooling system.

Second, even when a part of the components of the PE-battery water cooling system fails, the PE cooling system and the battery cooling system are forcibly switched to an integrated cooling mode allowing the cooperative cooling control between the PE cooling system and the battery cooling system. Therefore, cooling performance for the PE components and the battery is ensured, so that it is possible to prevent the PE components and the battery from overheating and to prevent a second failure, which is a complete failure of the PE components and the battery.

Third, since a second failure of the PE components and the battery is prevented, it is possible to prevent excessive customer service cost, which may be caused by a second failure.

Fourth, even when a part of the components of the PE-battery water cooling system fails, it is possible to protect the PE components and the battery to maintain them in good condition and to ensure safe driving of the vehicle to a maintenance site.

BRIEF DESCRIPTION OF THE DRAWINGS

The above and other objects, features, and other advantages of the present disclosure will be more clearly understood from the following detailed description when taken in conjunction with the accompanying drawings, in which.

DETAILED DESCRIPTION OF THE DISCLOSURE

Hereinbelow, embodiments of the present disclosure are described in detail with reference to the accompanying drawings.

Referring to FIGS. 4-7, a power electronics (PE)-battery water cooling system includes a PE cooling system 10 cooling power electronics, i.e., PE components such as a motor and an inverter; and a water battery cooling system 20 cooling a battery.

The PE cooling system 10 includes: a first electric water pump (EWP) 12 pumping a coolant to a cooling passage of a PE component 13; a radiator 14 cooling the coolant discharged after circulating through the PE component 13; and a reservoir 15 where the coolant is accommodated.

The battery cooling system 20 includes a second EWP 22 pumping the coolant to a cooling passage of a battery 23 and a chiller 24 discharging the coolant circulating through the battery 23 and having cooling heat of the battery 23 to the outside.

A first three-way valve 11 is connected between the reservoir 15, the first EWP 12, and the second EWP 22. The first three-way valve 11 is switched so that the coolant from the reservoir 15 flows into the first EWP 12 or the second EWP 22.

A second three-way valve 21 is connected between the chiller 24, the first EWP 12, and the second EWP 22. The second three-way valve 21 is switched so that the coolant from the chiller 24 flows into the first EWP 12 or the second EWP 22.

In the PE-battery water cooling system, the switching of the first three-way valve 11 and the second three-way valve 21 may be controlled to prevent an exchange of the coolant between the PE cooling system 10 and the battery cooling system 20. Accordingly, the PE cooling system 10 and the battery cooling system 20 are in a separate state in which the coolant does not flow therebetween such that a separate cooling mode is realized in which the PE cooling system 10 and the battery cooling system 20 are operated independently.

Conversely, the switching of the first three-way valve 11 and the second three-way valve 21 may be controlled to allow the exchange of the coolant between the PE cooling system 10 and the battery cooling system 20. Accordingly, the PE cooling system 10 and the battery cooling system 20 are in a state in which the coolant flows therebetween such that an integrated cooling mode is realized in which the PE cooling system 10 and the battery cooling system 20 are operated in an integrated manner.

The present disclosure is intended to provide a control method enabling excellent cooling of the PE components and the battery by means of a cooperative cooling control. The cooperative cooling control enables the exchange of the coolant between the PE cooling system and the battery cooling system when one or more of the components of the PE-battery water cooling system, such as the first EWP, a radiator fan, the second EWP, or the chiller, fail.

The cooperative cooling control enabling the exchange of the coolant between the PE cooling system and the battery cooling system is described with reference to FIGS. 4-9 with respect to each embodiment in which each one of the components of the PE-battery water cooling system, which are the first EWP, the radiator fan, the second EWP, or the chiller, fails.

First Embodiment

Figure 4:
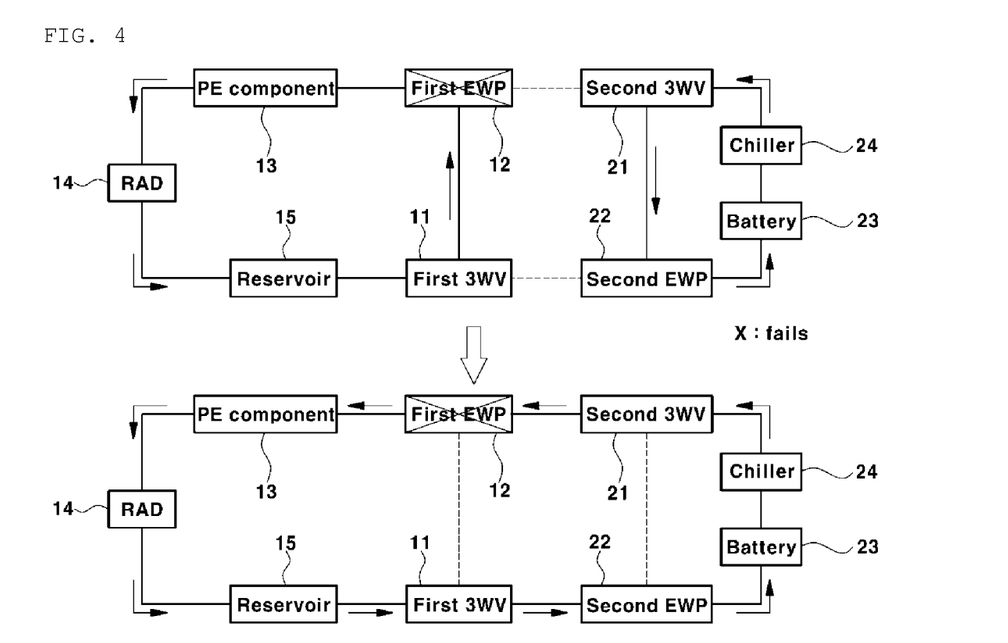
FIG. 4 is a configuration diagram illustrating the PE-battery water cooling system forcibly switched to the integrated cooling mode when a first EWP of the PE-battery water cooling system fails according to the present disclosure.
Figure 8:
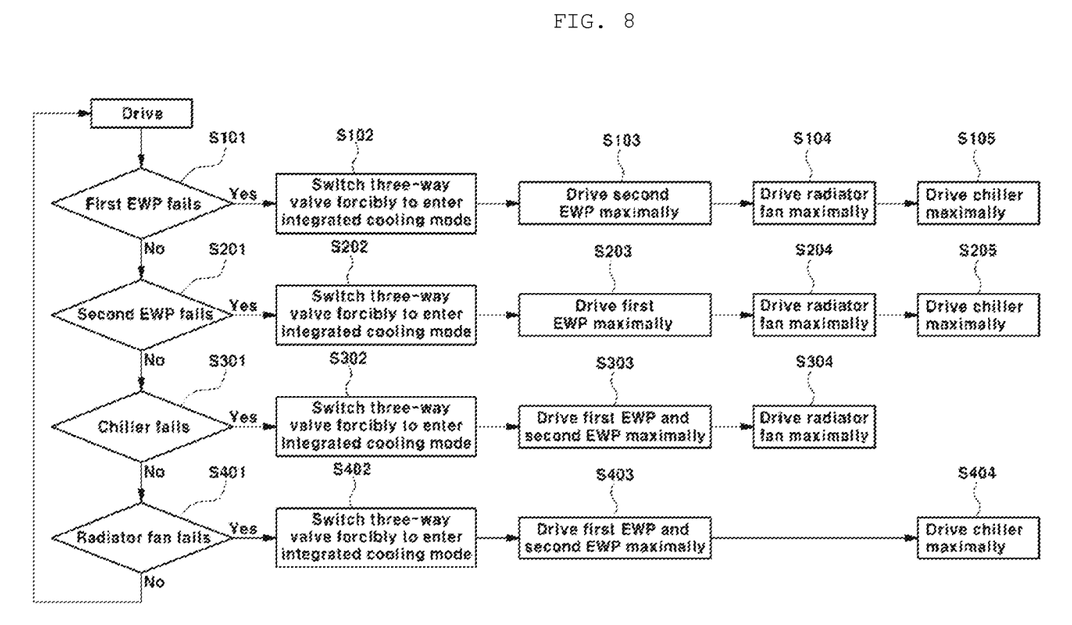
FIG. 8 is a flowchart illustrating a cooperative control process of the PE-battery water cooling system during driving of a green vehicle according to the present disclosure.

FIG. 4 is a configuration diagram illustrating the PE-battery water cooling system forcibly switched to the integrated cooling mode when the first EWP of the PE-battery water cooling system fails. FIG. 8 is a flowchart illustrating a method of controlling the PE-battery water cooling system when the first EWP fails.

When the PE cooling system 10 and the battery cooling system 20 are respectively operated in the separate cooling mode and when the first EWP 12 of the PE cooling system 10 fails during driving of an electric vehicle or a hybrid vehicle equipped with the PE-battery water cooling system, cooling of the PE components such as the motor and the inverter according to the PE cooling system 10 is not performed efficiently.

The first EWP serves to circulate the coolant through the cooling passage of the PE components, such as the motor and the inverter. When the first EWP fails, the heat of the PE components increases and the temperature of the PE components rises rapidly. The failure of the first EWP seriously affects the driving of the vehicle.

Here, the PE-battery cooling system maintains the separate cooling mode when the PE components are at a high temperature. However, when the first EWP fails, the temperature of the PE components rises but it is impossible to cool the PE components. As a result, the vehicle may not be driven because of shutdown of the motor caused by over-temperature of the inverter or other reasons.

In order to solve the problem, according to the present disclosure, when the first EWP 12 of the PE cooling system 10 fails, the first three-way valve 11 and the second three-way valve 21 are switched in a direction in which the coolant can flow between the PE cooling system 10 and the battery cooling system 20. The cooperative cooling control is thus performed between the battery cooling system 20 and the components of the PE cooling system 10 except the first EWP 12.

A controller (not illustrated) determines whether the first EWP 12 fails during driving of the vehicle (S101). When it is determined that the first EWP 12 fails, the controller controls to forcibly switch the first three-way valve 11 and the second three-way valve 21 to a position where the exchange of the coolant is possible between the PE cooling system 10 and the battery cooling system 20 (S102).

Thus, the PE cooling system 10 and the battery cooling system 20 are in a state of being capable of exchanging the coolant with each other, thereby realizing the integrated cooling mode in which the PE cooling system 10 and the battery cooling system 20 are operated in an integrated manner.

In the integrated cooling mode, driving two water pumps is required, such as the first EWP 12 and the second EWP 22, to ensure the flow velocity and the flow rate of the coolant. However, the cooling performance may be insufficient due to failure of the first EWP 12.

Accordingly, an operation speed of the second EWP 22 of the battery cooling system 20 is forcibly controlled to maximum by a control signal of the controller, thereby maximizing the flow velocity and the flow rate of the coolant (S103).

In addition, an operation speed of a fan motor of the radiator 14 is driven to maximum by a control signal of the controller, thereby excellently cooling the coolant exiting the PE component 13 (S104).

In addition, an operation speed of the chiller 24 is driven to maximum by a control signal of the controller, thereby excellently cooling the coolant exiting the cooling passage of the battery 23 (S105).

As described above, even when the first EWP 12 of the PE cooling system 10 fails, the cooperative cooling control between the PE cooling system 10 and the battery cooling system 20 allows sufficient cooling of the PE components and the battery.

A test was performed in the failure state of the first EWP 12 of the PE cooling system 10 to observe the temperature change of the PE component (for example, the inverter) and the battery temperature rise time. The results are shown in Table 1 and Table 2 below.

TABLE 1

| PE EWP failure | | No integrated cooling mode for first EWP failure | On integrated cooling mode for first EWP failure |
|---|---|---|---|
| PE component cooling | | Impossible | Possible |
| Inverter temperature | Initial temperature | 23° C. | 23° C. |
| | After high speed driving | 147° C. (Overheat prevention temperature level) | 85° C. (62° C.↓) |

As shown in Table 1, the temperature of the inverter, which is one of the PE components, rose to the overheat prevention temperature level or more (for example, 147° C.) from the initial temperature when the first EWP 12 failed. However, even after high-speed driving for a predetermined period of time, the temperature of the inverter was lowered below the overheat protection level (for example, 85° C.) by the cooperative cooling control between the PE cooling system 10 and the battery cooling system 20. This demonstrates that the PE component was sufficiently cooled by the cooperative cooling control between the PE cooling system 10 and the battery cooling system 20 when the first EWP failed.

TABLE 2

| PE EWP failure | Applying integrated cooling mode for first EWP failure | No integrated cooling mode for first EWP failure |
|---|---|---|
| Time for rise in battery temperature (31° C. → 36° C.) | 750 sec | 350 sec |

Although the PE component can be sufficiently cooled by the cooperative cooling control between the PE cooling system 10 and the battery cooling system 20 when the first EWP 12 fails, the temperature of the battery may rise to an appropriate temperature or more.

However, as shown in Table 2 above, the time taken for the temperature of the battery to rise (for example, the time taken to rise from 31° C. to 36° C.) was suppressed by driving the chiller 24 to maximum. This demonstrates that a rise in temperature of the battery can be suppressed even though the first EWP fails so that there is no problem in driving of the vehicle and sufficient operation time can be ensured until maintenance is performed.

Second Embodiment

Figure 5:
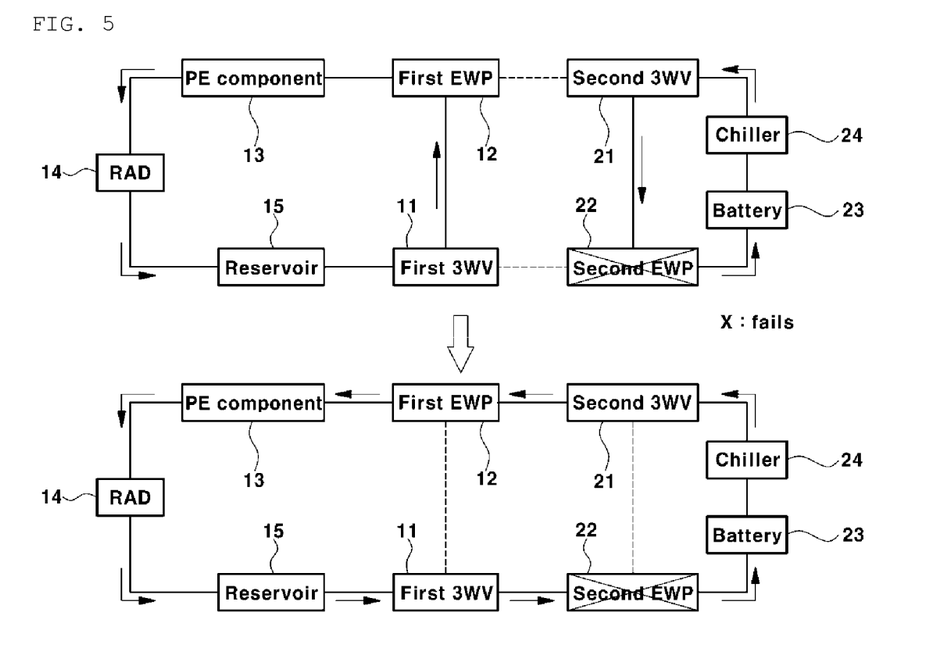
FIG. 5 is a configuration diagram illustrating the PE-battery water cooling system forcibly switched to the integrated cooling mode when a second EWP of the PE-battery water cooling system fails according to the present disclosure.

FIG. 5 is a configuration diagram illustrating the PE-battery water cooling system forcibly switched to the integrated cooling mode when the second EWP of the PE-battery water cooling system fails. FIG. 8 is a flowchart illustrating a method of controlling the PE-battery water cooling system when the second EWP fails.

When the PE cooling system 10 and the battery cooling system 20 are respectively operated in the separate cooling mode and when the second EWP 22 of the battery cooling system. 20 fails during driving of an electric vehicle or a hybrid vehicle equipped with the PE-battery water cooling system, cooling of the battery according to the battery cooling system 20 is not performed efficiently.

The second EWP 22 serves to circulate the coolant through the cooling passage of the battery 23. When the second EWP 22 fails, the battery 23 temperature may rise to an appropriate limit or threshold temperature or more.

Even when the battery is not cooled sufficiently due to the failure of the second EWP 22, the temperature of the battery 23 does not rapidly rise due to the large heat capacity thereof, although the amount of heat generated by the battery is large.

However, when the temperature rises due to the failure of the second EWP 22, it is not easy to lower the temperature of the battery in a situation where excellent cooling is not performed with consideration of the large heat capacity of the battery.

When the temperature of the battery 23 rises above the limit temperature, the input-output current amount of the battery 23 may be limited to zero amperes. Therefore, it is important to maintain the temperature of the battery 23 from rising to the limit temperature or more.

Furthermore, the failure of the second EWP 22 not only affects the temperature rise of the battery during driving of the vehicle, but also affects the temperature rise of the battery during charging of the battery. Particularly, in the case of rapid charging, the heat generation is very large due to the high current amount. Thus, it is important to control to prevent the temperature of the battery 23 from rising to the limit temperature or more when the second EWP 22 fails.

According to the present disclosure, when the second EWP 22 of the battery cooling system 20 fails, the first three-way valve 11 and the second three-way valve 21 are forcibly switched in a direction in which the coolant can flow between the PE cooling system 10 and the battery cooling system 20. The cooperative cooling control is thus performed between the PE cooling system 10 and the battery cooling system 20 except the second EWP 22.

The controller (not illustrated) determines whether the second EWP 22 fails during driving of the vehicle (S201). When it is determined that the second EWP 22 fails, the controller controls to forcibly switch the first three-way valve 11 and the second three-way valve 21 to a position where the exchange of the coolant is possible between the PE cooling system 10 and the battery cooling system 20 (S202).

Thus, the PE cooling system 10 and the battery cooling system 20 are in a state of being capable of exchanging the coolant with each other, thereby realizing the integrated cooling mode in which the PE cooling system 10 and the battery cooling system 20 are operated in an integrated manner.

In the integrated cooling mode, driving two water pumps is required, such as the first EWP 12 and the second EWP 22, to ensure the flow velocity and the flow rate of the coolant. However, the cooling performance may be insufficient due to failure of the second EWP 22.

Accordingly, an operation speed of the first EWP 12 of the battery cooling system 10 is forcibly controlled to maximum by a control signal of the controller, thereby maximizing the flow velocity and the flow rate of the coolant (S203).

In addition, an operation speed of the fan motor of the radiator 14 is driven to maximum by a control signal of the controller, thereby excellently cooling the coolant exiting the PE component 13 (S204).

In addition, an operation speed of the chiller 24 is driven to maximum by a control signal of the controller, thereby excellently cooling the coolant exiting the cooling passage of the battery 23 (S205).

As described above, even when the second EWP 22 of the battery cooling system 20 fails, the cooperative cooling control between the PE cooling system 10 and the battery cooling system 20 allows sufficient cooling of the PE components and the battery.

When the second EWP 22 fails while charging the battery 23 in a state where the electric vehicle or the hybrid vehicle equipped with the PE-battery water cooling system is stopped or parked rather than being driven, the temperature of the battery 23 may rise to the limit temperature or more.

When charging the battery 23 (for example, rapid charging), the PE component 13 does not operate, and a charger and the battery are directly connected to each other. Thus, the temperature of the battery rises in accordance with the input current while charging the battery 23.

Accordingly, it is preferable the temperature of the battery 23 is prevented from rising to the limit temperature or more, although the second EWP 22 fails while charging the battery 23 in a state where the electric vehicle or the hybrid vehicle is stopped or parked rather than being driven.

Figure 9:
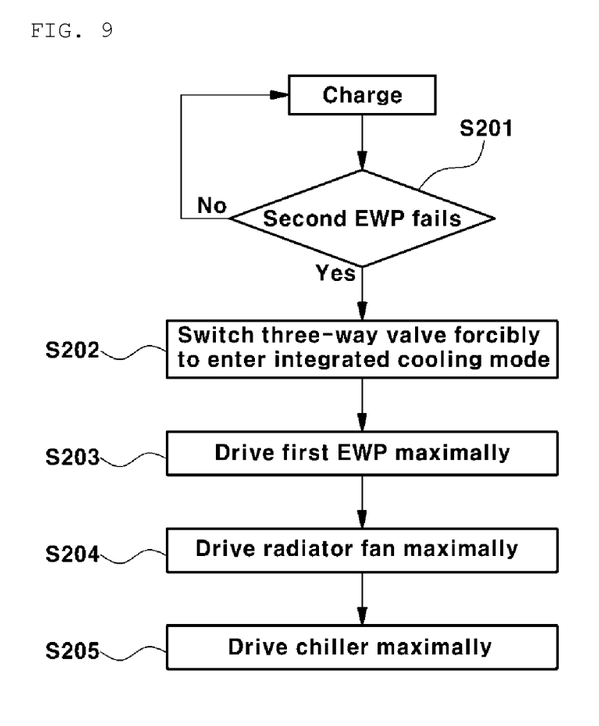
FIG. 9 is a flowchart illustrating the cooperative control process of the PE-battery water cooling system during charging of the green vehicle according to the present disclosure.

Therefore, as illustrated in the accompanying flowchart of FIG. 9, the controller monitors whether the second EWP 22 fails while charging the battery 23. When it is determined that the second EWP 22 fails, S201 to S205 are performed in the same manner whereby it is possible to prevent the temperature of the battery 23 from rising to the limit temperature or more while charging the battery 23.

Third Embodiment

Figure 6:
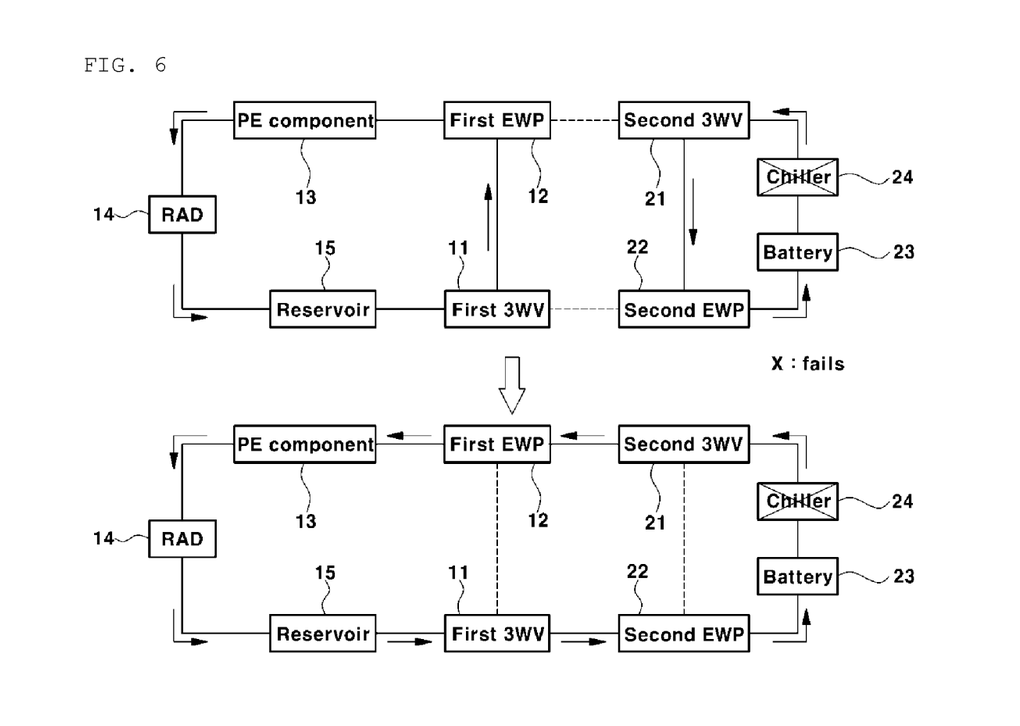
FIG. 6 is a configuration diagram illustrating the PE-battery water cooling system forcibly switched to the integrated cooling mode when a chiller of the PE-battery water cooling system fails according to the present disclosure.

FIG. 6 is a configuration diagram illustrating the PE-battery water cooling system forcibly switched to the integrated cooling mode when the chiller of the PE-battery water cooling system fails. FIG. 8 is a flowchart illustrating a method of controlling the PE-battery water cooling system when the chiller fails.

When the PE cooling system 10 and the battery cooling system 20 are respectively operated in the separate cooling mode and when the chiller 24 of the battery cooling system 20 fails during driving of an electric vehicle or a hybrid vehicle equipped with the PE-battery water cooling system, cooling of the battery according to the battery cooling system 20 is not performed efficiently.

The chiller 24 serves to cool the hot coolant exiting the cooling passage of the battery 23, operates only in the separate cooling mode, and maintains the temperature of the battery 23 at a low level.

According to the present disclosure, when the chiller 24 of the battery cooling system 20 fails, the first three-way valve 11 and the second three-way valve 21 are forcibly switched in a direction in which the coolant can flow between the PE cooling system 10 and the battery cooling system 20. The cooperative cooling control is thus performed between the PE cooling system 10 and the battery cooling system 20.

The controller (not illustrated) determines whether the chiller 24 fails during driving of the vehicle (S301). When it is determined that the chiller 24 fails, the controller controls to forcibly switch the first three-way valve 11 and the second three-way valve 21 to a position where the exchange of the coolant is possible between the PE cooling system 10 and the battery cooling system 20 (S302).

Thus, the PE cooling system 10 and the battery cooling system 20 are in a state of being capable of exchanging the coolant with each other, thereby realizing the integrated cooling mode in which the PE cooling system 10 and the battery cooling system 20 are operated in an integrated manner.

Here, the PE component 13 operates in a temperature range of about 70° C., which is higher than the temperature of the battery, which is about 20° C. Thus, it is possible to sufficiently cool the coolant in accordance with the cooling operation of the radiator 14 by circulating the high-temperature coolant exiting the cooling passage of the battery 23 to the radiator 14.

Accordingly, in order to allow the coolant to flow between the PE cooling system 10 and the battery cooling system 20 efficiently, the first EWP 12 of the PE cooling system 10 and the second EWP 22 of the battery cooling system 20 are simultaneously driven by a control signal of the controller (S303).

An operation speed of the fan motor of the radiator 14 is driven to maximum by a control signal of the controller (S304). Therefore, the coolant exiting the cooling passage of the battery 23 passes through the cooling passage of the PE component 13 and flows to the radiator 14, and thus can be easily cooled.

Fourth Embodiment

Figure 7:
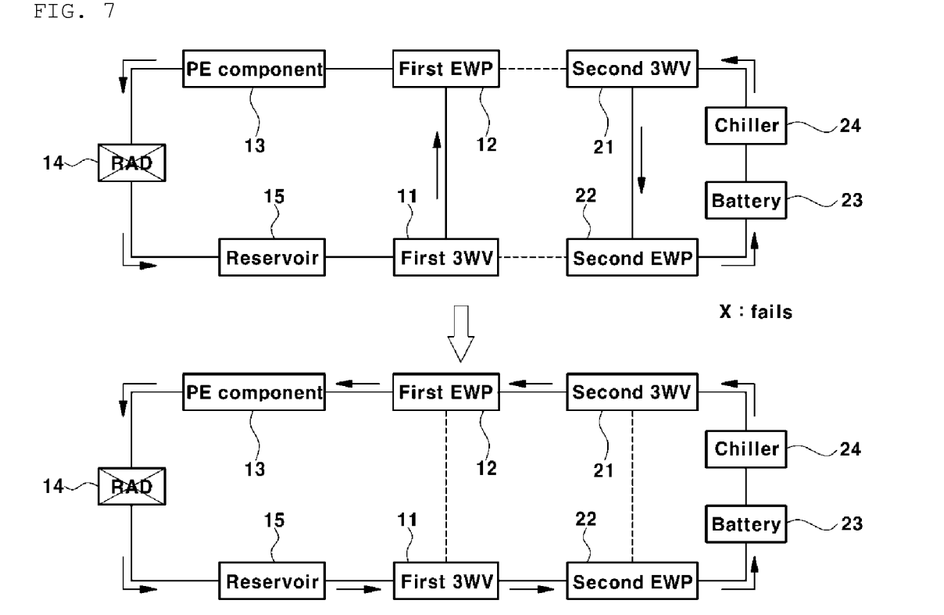
FIG. 7 is a configuration diagram illustrating the PE-battery water cooling system forcibly switched to the integrated cooling mode when a radiator fan of the PE-battery water cooling system fails according to the present disclosure.

FIG. 7 is a configuration diagram illustrating the PE-battery water cooling system forcibly switched to the integrated cooling mode when a radiator fan of the PE-battery water cooling system fails. FIG. 8 is a flowchart illustrating a method of controlling the PE-battery water cooling system when the radiator fan fails.

The radiator 14 discharges the heat of the PE component 13 to the outside. The speed of the fan motor included in the radiator 14 is adjusted according to the amount of heat generated from the PE component 13 and the temperature of the PE component 13.

Even when the fan motor of the radiator 14 fails, it is possible to cool the coolant exiting the PE component by wind (i.e., air flow) or the like, but it may be insufficient to generate sufficient cooling performance.

Particularly, if the proper cooling is not performed, the motor and the inverter may not be driven because a switching semiconductor of the inverter, which is the PE component 13, has a small heat capacity and generates a large amount of heat.

According to the present disclosure, when the fan motor of the radiator 14 of the PE cooling system 10 fails, the first three-way valve 11 and the second three-way valve 21 are forcibly switched in a direction in which the coolant can flow between the PE cooling system 10 and the battery cooling system 20. The cooperative cooling control is thus performed between the PE cooling system 10 and the battery cooling system 20.

The controller (not illustrated) determines whether the fan motor of the radiator 14 fails during driving of the vehicle (S401). When it is determined that the fan motor of the radiator 14 fails, the controller controls to forcibly switch the first three-way valve 11 and the second three-way valve 21 to a position where the exchange of the coolant is possible between the PE cooling system 10 and the battery cooling system 20 (S402).

Thus, the PE cooling system 10 and the battery cooling system 20 are in a state of being capable of exchanging the coolant with each other, thereby realizing the integrated cooling mode in which the PE cooling system 10 and the battery cooling system 20 are operated in an integrated manner.

Accordingly, in order to allow the coolant to flow between the PE cooling system 10 and the battery cooling system 20 efficiently, the first EWP 12 of the PE cooling system 10 and the second EWP 22 of the battery cooling system 20 are simultaneously driven by a control signal of the controller (S403).

An operation speed of the chiller 24 is driven to maximum by a control signal of the controller (S404). Therefore, the coolant exiting the cooling passage of the PE component 13 passes through the cooling passage of the battery 23 and flows to the chiller 24, and thus can be easily cooled.

As described above, even when a part of the components of the PE-battery water cooling system fails, excellent cooling of the PE components and the battery can be performed by the cooperative cooling control between the PE cooling system and the battery cooling system.

What is claimed is:

1. A method of controlling a power electronics (PE)-battery water cooling system for a green vehicle, in which the PE-battery water cooling system includes a PE cooling system in which a first electric water pump (EWP), a PE component, a radiator, a reservoir, and a first three-way valve are connected in order, and a battery cooling system in which a second EWP, a battery, a chiller, and a second three-way valve are connected in order, the method comprising:

switching the first three-way valve and the second three-way valve forcibly in a direction allowing a coolant to flow between the PE cooling system and the battery cooling system when a failure occurs in the components of the PE cooling system and the battery cooling system; and driving to maximum at least one of the components of the PE cooling system and the battery cooling system still functioning normally, wherein, among the components of the PE cooling system and the battery cooling system, when the chiller of the battery cooling system fails, the first three-way valve and the second three-way valve are forcibly switched by a control signal of a controller in the direction allowing the coolant to flow between the PE cooling system and the battery cooling system, the first EWP and the second EWP are driven simultaneously by a control signal of the controller, and a fan motor of the radiator is driven to maximum by a control signal of the controller, and wherein, among the components of the PE cooling system and the battery cooling system, when the fan motor of the radiator of the PE cooling system fails, the first three-way valve and the second three-way valve are forcibly switched by a control signal of the controller in the direction allowing the coolant to flow between the PE cooling system and the battery cooling system, the first EWP and the second EWP are driven simultaneously by a control signal of the controller, and the chiller is driven to maximum by a control signal of the controller.

2. The method of claim 1, wherein the first three-way valve and the second three-way valve are forcibly switched by a control signal of a controller in the direction allowing the coolant to flow between the PE cooling system and the battery cooling system such that the PE cooling system and the battery cooling system are switched from a separate cooling mode to an integrated cooling mode for a cooperative cooling control that enables an exchange of the coolant.

3. The method of claim 1, wherein, among the components of the PE cooling system and the battery cooling system, when the first EWP of the PE cooling system fails during driving of the vehicle, the first three-way valve and the second three-way valve are forcibly switched by a control signal of a controller in the direction allowing the coolant to flow between the PE cooling system and the battery cooling system, and the second EWP of the battery cooling system is driven to maximum by a control signal of the controller.

4. The method of claim 3, wherein, with the second EWP driven to maximum, a fan motor of the radiator and the chiller are driven to maximum by a control signal of the controller.

5. The method of claim 1, wherein, among the components of the PE cooling system and the battery cooling system, when the second EWP of the battery cooling system fails during driving of the vehicle, the first three-way valve and the second three-way valve are forcibly switched by a control signal of a controller in the direction allowing the coolant to flow between the PE cooling system and the battery cooling system, and the first EWP of the PE cooling system is driven to maximum by a control signal of the controller.

6. The method of claim 5, wherein, with the first EWP driven to maximum, a fan motor of the radiator and the chiller are driven to maximum by a control signal of the controller.

7. The method of claim 1, wherein, among the components of the PE cooling system and the battery cooling system, when the second EWP of the battery cooling system fails during charging of the battery,
  the first three-way valve and the second three-way valve are forcibly switched by a control signal of a controller in the direction allowing the coolant to flow between the PE cooling system and the battery cooling system, and
  the first EWP of the PE cooling system is driven to maximum by a control signal of the controller.

8. The method of claim 7, wherein, with the first EWP driven to maximum, a fan motor of the radiator and the chiller are driven to maximum by a control signal of the controller.

\* \* \* \* \*